Sept. 4, 1945.  R. E. CHERRY ET AL  2,383,956
REDUCTION GEAR
Filed Dec. 24, 1943  2 Sheets-Sheet 1
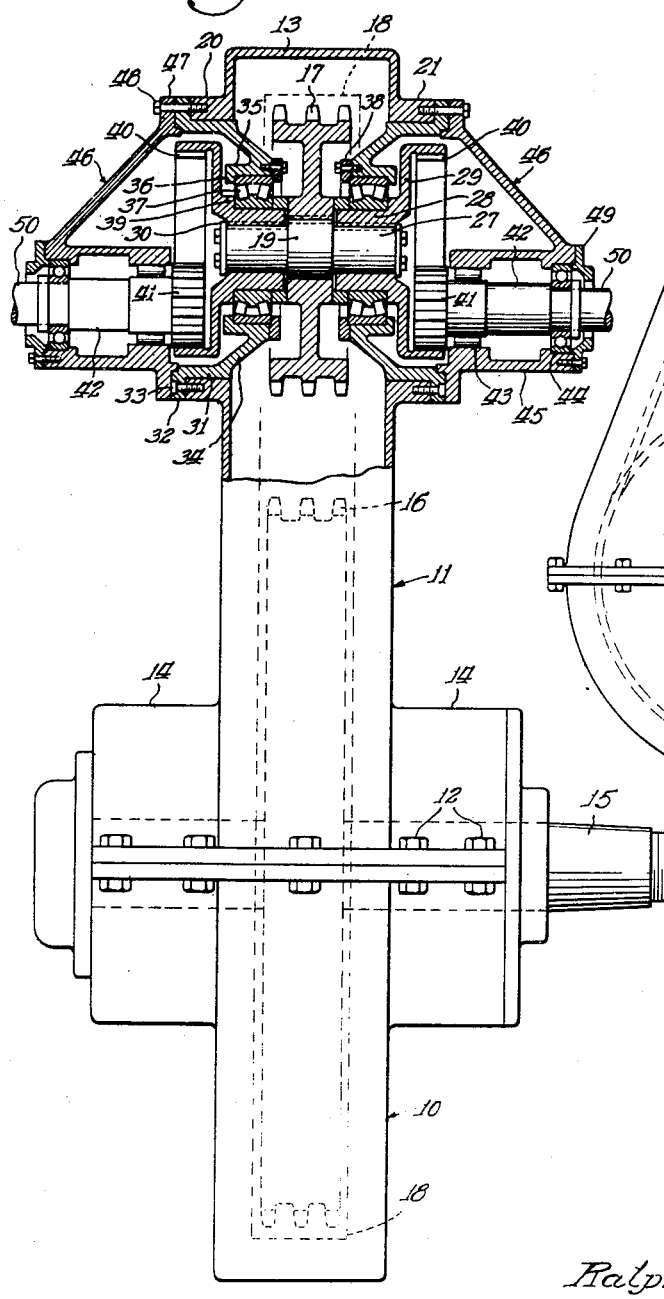
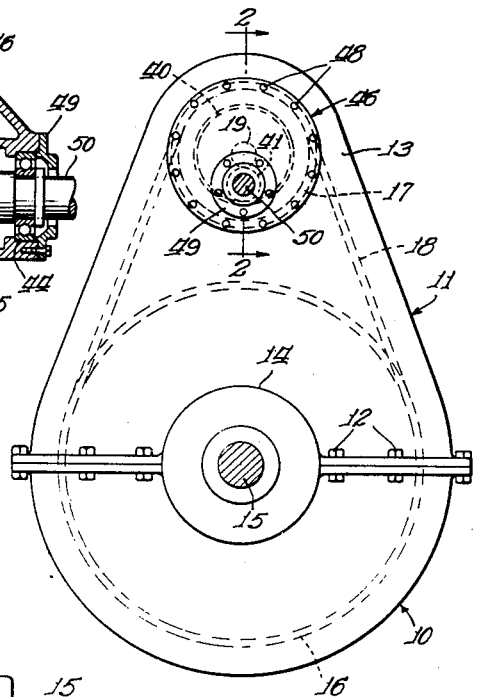
Inventors:
Ralph E. Cherry and
Norman C. Bremer
By: Edward C. Fitzbaugh
Atty.

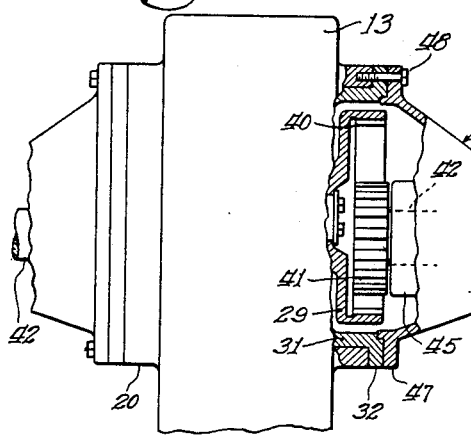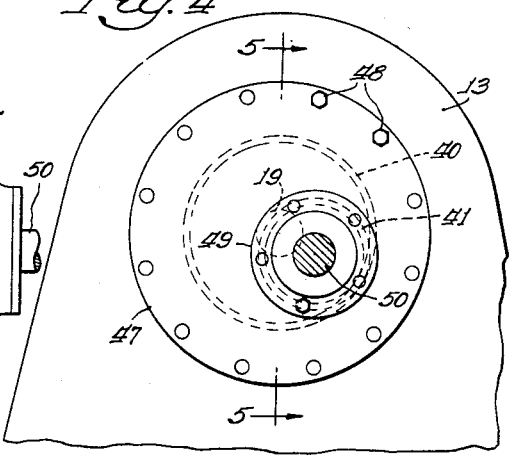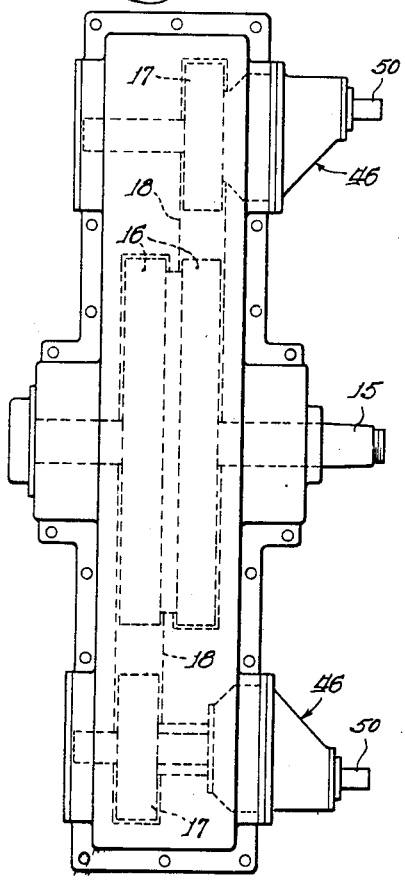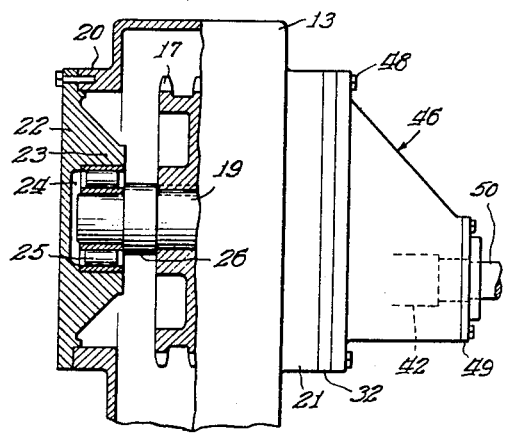

Patented Sept. 4, 1945

2,383,956

UNITED STATES PATENT OFFICE 2,383,956

REDUCTION GEAR

Ralph E. Cherry, Detroit, Mich., and Norman C. Bremer, Ithaca, N. Y., assignors to Morse Chain Company, Ithaca, N. Y., a corporation of New York Application December 24, 1943, Serial No. 515,530

14 Claims. (Cl. 74—389)

The present invention relates to reduction gears and more particularly to a speed reducer for use with moderate and high speed engines as prime movers where low speed and high torque are required for the driven units. A structure of this character may be advantageously employed for driving the propeller shafts of small naval vessels.

In the assembly herein contemplated the first stage reduction from the engine drive shaft is accomplished by the use of an internal or ring gear and a spur gear or pinion, and the second stage reduction thereof, or lower speed range, embodies a chain and sprocket assembly. Usually with high speeds of the driven or output shaft it has been the practice to employ smaller and lighter chains in order to reduce centrifugal action thereon, but with the present structure a standardized chain drive using a heavy chain may be used and the final output speed is determined through the medium of a reduction gear unit that is readily interchangeable without disturbing or altering the chain and sprocket assembly.

In a majority of installations, the chain and sprocket assembly is quite bulky and it does not usually embody sufficient flexibility to permit changing the speed ratios thereof to accommodate it to various power plants, and furthermore due to centrifugal force the chain and sprocket assembly is usually better adapted for use in the lower speed range.

The present improvements contemplate the use of a reduction gear assembly that is in the form of a unitary structure having interchangeability which permits a unit that embodies a predetermined speed ratio to be readily installed in a more or less standard chain and sprocket assembly without alteration of the latter. Thus the sprocket and chain drive is maintained with fixed center positions and a standardized heavy chain which do not require change when the speed ratio is altered. By reason of this selective and predetermined gear ratio, the sprocket wheels may be of large diameter for the purpose of reducing chordal chain pull to a minimum. After the required unit has been positioned on the main housing, and before it is anchored in place, said unit may be bodily rotated to bring the stub shaft thereof into proper relation with respect to the shaft of the motor or prime mover.

The structure contemplated herein is adapted for use in connection with a single chain and sprocket reduction assembly having a double or single prime mover, or it may be used with a double chain and sprocket reduction unit employing prime movers for the pinion sprocket shafts. Also the reduction gear unit may be installed upon both ends or upon one end of the pinion sprocket shaft. Thus the power input units may be compounded from two sources in a single reduction unit and from four sources in a double reduction unit.

The present improvements preferably embody a cap or casing of somewhat conic shape with a circular base that adapts it to be placed in a plurality of positions eccentrically of the pinion sprocket axis at the time it is being mounted upon the portion of the housing that is adjacent the pinion sprocket shaft of the chain and sprocket assembly. The cap or casing journals and carries a stub shaft and the pinion of the gear reduction for meshed assembly with an internal or ring gear that is carried by the pinion sprocket shaft. The size of said pinion predetermines the ratio of gear reduction, and since its axis is eccentric to the axis of the ring gear on the pinion sprocket shaft any change in the size of said pinion will necessarily shift the axis of its stub shaft either toward or away from the axis of this sprocket shaft. In the structure herein contemplated, the casing, the stub shaft and the pinion comprise a unit that is adapted for assembly with the large housing for the chain and sprocket structure. By providing a plurality of these units wherein the stub shaft and the different size spur gears are properly disposed, it is possible to readily install the desired unit for a predetermined gear reduction, or to change one reduction ratio for another merely by substituting or interchanging these units. It is an object to thus secure flexibility of installation for different uses.

It is the principal object of this invention to simplify the construction of a speed reducer such as contemplated herein, and to improve the efficiency, operation and dependability of such speed reducer. Further, it is an object to provide a construction in which various types and sizes of prime movers may be applicable, and wherein standard parts from stock may be used, thereby eliminating the necessity of manufacturing and keeping large stocks of different size chains and parts on hand for many different applications. This in turn lessens the amount of machinery and expense for making up such parts, and eliminates delay and confusion in securing replacements.

Additional objects, aims and advantages of the invention disclosed herein will be apparent to persons skilled in the art after the construction and operation of the speed reducer is understood from the within description.

It is preferred to accomplish the numerous objects of this invention and to practice the same in substantially the manner hereinafter fully described and as more particularly pointed out in the appended claims, reference being made to the accompanying drawings that form a part of this specification, wherein:

Fig. 1 is a vertical front elevation of a speed reducer embodying the improvements contemplated herein;

Fig. 2 is a vertical side elevation of the structure shown in Fig. 1 with the upper portions in vertical section on line 2—2 thereof on a plane through the axes of the input or stub shafts and the pinion sprocket shaft;

Fig. 3 is a view similar to Fig. 2, illustrating the application of this invention to a double chain and sprocket reduction assembly;

Fig. 4 is a fragmental front elevation of a gear reduction of a different ratio than that shown in Fig. 2;

Fig. 5 is a transverse section made on the plane of line 5—5 on Fig. 4 and looking in the direction of the arrows; and Fig. 6 is a partly sectional elevation showing the manner of using a single input unit.

The drawings are to be understood as being more or less of a schematic character for the purpose of disclosing a typical or preferred form of the improvements contemplated herein, and in these drawings like reference characters identify the same parts in the several views.

The structure illustrated in Figs. 1 and 2 embodies a hollow two-part housing comprising a semi-cylindrical section 10 and a substantially triangular-shape section 11 that are connected to each other at their flanged abutting edges by bolts 12, the narrow end of the triangular housing section 11 terminating in a segmental or arcuate portion 13. At the juncture between the housing sections 10 and 11 the opposite side walls thereof have aligned cylindrical bosses 14 to receive anti-friction or roller bearings (not shown) for journalling the output or driven shaft 15 that is adapted to be operatively connected to the propeller shaft of the boat, or other element to be rotated at a slower speed ratio than the engine or other prime mover that actuates the assembly.

The large sprocket wheel 16 of the chain and sprocket assembly is splined or otherwise secured to the shaft 15 intermediate the bearings of the latter, and the pinion sprocket wheel 17 is operatively connected with the large sprocket wheel 16 by the chain 18. This pinion sprocket wheel 17 is splined or otherwise secured to the intermediate portion of its shaft 19 that is positioned with its axis coincident or aligned with the axis of the segmental portion 13 of the housing as shown in Fig. 1.

The sides of the narrow segmental end portion 13 of the hollow housing is provided with aligned openings that are respectively bounded or surrounded by outwardly extending flanges 20 and 21. These openings are adapted to receive the hereinbefore mentioned unitary reduction gear assemblies that may be mounted in both openings as shown in Fig. 2 or only one of these assemblies may be utilized as shown in Fig. 6. The ends 27 of shaft 19 which are of reduced diameter, project beyond the sides of the sprocket 17 and have the hubs 28 of the carriers 29 splined or otherwise secured to them, as shown in Fig. 2. Retainer washers 30 are bolted to the ends of the shaft portions 27 to maintain the carriers against accidental longitudinal movement.

Cylindrical bearing supporting members 31 are inserted into the openings bounded by the flanges 20 and 21, and have laterally disposed anchoring lips 32 that are engaged with the outer end edges of said flanges 20 and 21 to which they are secured by bolts 33. The bearing supporting members 31 have tapered inner portions 34 of frustrum-conic shape that project inwardly toward the sprocket wheel 17, and there are tubular bearing flanges 35 that extend inside these tapered portions 34 toward the carrier 29 where they are formed with inturned lips 36. Anti-friction thrust bearings 37 are interposed between the carrier hubs 28 and the tubular bearing flanges 35 that surround them, said anti-friction bearings 37 being held in position by retainer washers 38 that are bolted to the inner ends of the tapered portions 34. The opposite ends of the anti-friction thrust bearings 37 are engaged against the inturned lips 36 and the shoulders 39 that are formed on the carrier hubs 28.

The instrumentalities for effecting a predetermined gear reduction comprise internal or ring gears 40 on the carriers 29 and the pinions 41 secured upon the inner ends of stub shafts 42 that have their axes parallel to, but in off-set or eccentric relation to, the axis of the sprocket wheel shaft 19. The ring gears 40 are of such dimensions that they are readily accommodated in the tubular portions 31 of the bearing supporting members. Bearings 43 and 44 are provided for the stub shafts 42 in cylindrical bosses 45 that are preferably integral parts of removable and interchangeable casings or caps 46. These casings or caps 46 have been provided with anchoring flanges 47 here shown as of a circular outline, that are secured to the housing flanges 20 and 21 by bolts 48 which also pass through the anchoring flanges 32 of the bearing supporting members.

The casings or caps 46 are of modified or distorted conic shapes with their axes eccentric to the axis of the adjacent sprocket shaft 19. The apical portions of these casings or caps 46 are flat and they are closed by centrally apertured plates 49 surrounding the stub shafts 42. The power input ends 50 of the stub shafts 42 project out of the casings or caps 46 and are secured in any suitable manner, preferably by universal joints, each to the adjacent ends of a motor shaft or other prime mover (not shown).

The relative proportions of the pinions 41 and their intermeshed ring gears 40 predetermine the ratio of speed reduction that is transmitted to the secondary speed reducer that comprises the chain and sprocket wheel assembly within the housing. The casings or caps 46 and the stub shafts 42 with their pinions 41 and bearings 43 and 44 each comprise a unitary structure that is removable as a whole from the housing merely by withdrawing the anchoring bolts 48. Whenever it is desired to change the ratio of gear reduction, this may be readily effected by removing the casing or cap units and substituting therefor other assembled units wherein the pinions 41 are of the required dimensions for a specified ratio or reduction. In the units that have replaced the removed units the axes of both stub shafts 42 will be either nearer to or farther from the axis of the pinion sprocket shaft 19, depending of course upon whether the substituted pinions 41 are respectively larger or smaller than the pinions of the previous units. A unit for a different ratio is shown in Figs. 4 and 5. In making this change-over it is not necessary to disturb the chain and sprocket wheel assembly, and it, therefore, may be standardized and of a permanent character.

In Fig. 3 there is shown a speed reducer wherein a double chain and sprocket assembly is employed with a motor drive at each end of the housing. In this type of structure the housing is longer than in the form above described and the output or driven shaft 15 is longer in order to accommodate a side by side pair of the large sprocket wheels 16 thereon. The pinion sprocket wheels 17, which are at the ends of the oppositely tapered housing, are offset with relation to each other. Thus each pinion sprocket wheel is aligned with one of the driven sprocket wheels 17 with which the pinion sprockets have operative connection through the instrumentality of separate chains 18 that extend in opposite directions from the driven sprocket wheels 17.

In Fig. 6 there is shown an arrangement wherein the unitary reduction gear assembly is mounted in cooperation with one end of the pinion sprocket shaft 19, and omitted at the other end of this shaft. When a single assembly is used as in Fig. 6 a closure plate or bearing support 22, having an inwardly projecting tapered boss 23 is bolted to the flange 20. The inner portion of the boss 23 is provided with a recess 24 in which anti-friction bearings 25 are seated to journal the adjacent end of the pinion sprocket shaft 19. Intermediate the bearings 25 and the hub of the sprocket 17, this shaft 19 is provided with an enlargement or collar 26 that maintains the bearing 25 in its seat and also spaces the sprocket from the adjacent side of the housing. The unitary reduction gear assembly with its stub shaft 42 is mounted in coactive relation with the ring gear and is secured to the adjacent flange 21 in the position shown to align it with the shaft of the motor or prime mover.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

We claim:

1. A speed reducer comprising a chain and sprocket reducing assembly that includes a sprocket pinion shaft; a carrier having a ring gear mounted on and rotatable with said shaft; and a readily replaceable unitary assembly comprising a spur gear in mesh with said ring gear and disposed with its axis eccentric to the axis of said pinion sprocket shaft; and means for supporting and rotating said spur gear, said unitary assembly being readily removable from operative relation with respect to said ring gear and replaceable by a different unitary assembly to effect a change of speed ratio with respect to said ring gear.

2. A speed reducer comprising a chain and sprocket reducing assembly that includes a sprocket pinion shaft; a carrier having a ring gear mounted on and rotatable with said shaft; and a readily replaceable unitary assembly comprising a rotatable stub shaft disposed with its axis eccentric to the axis of said pinion sprocket shaft; and a spur gear secured to said stub shaft in mesh with said ring gear, said unitary assembly being readily removable from cooperative relation with said ring gear and replaceable by a different unitary assembly to effect a change of speed ratio with respect to said ring gear.

3. A speed reducer comprising a chain and sprocket reducing assembly that includes a sprocket pinion shaft; a carrier having a ring gear mounted on and rotatable with said shaft; and a readily replaceable unitary assembly comprising a spur gear meshed with said ring gear and disposed with its axis eccentric to the axis of said pinion sprocket shaft; and means for supporting and rotating said spur gear, said unitary assembly being mountable in a plurality of positions that are located in a path concentric to the axis of said ring gear.

4. A speed reducer comprising a hollow housing having an opening in a side wall; a speed reducing assembly operating in said housing, said assembly including a shaft aligned with said opening; a carrier fast on said shaft; a ring gear on said carrier; and a readily replaceable interchangeable unit comprising a hollow cap removably mounted on said housing to close said opening; a spur gear rotatably mounted in said cap with its axis eccentric to the axis of said shaft; and rotatable means for supporting and rotating said spur gear within said cap.

5. A speed reducer comprising a hollow housing having an opening in a side wall; a speed reducing assembly operating in said housing, said assembly including a shaft aligned with said opening; a carrier fast on said shaft; a ring gear on said carrier; and a readily replaceable interchangeable unit comprising a hollow cap detachably mounted on said housing to close said opening; a stub shaft journaled in said cap with its axis in offset relation to the axis of the first-mentioned shaft; and a spur gear secured to and supported by said stub shaft in mesh with said ring gear.

6. A speed reducer comprising a hollow housing having an opening in a side wall; a speed reducing assembly operating in said housing, said assembly including a shaft aligned with said opening; a carrier fast on said shaft; a ring gear on said carrier and disposed concentrically in said housing opening; and a readily replaceable interchangeable unit comprising a hollow cap removably mounted on said housing to close said opening; a stub shaft carried by said cap and journaled therein with its axis eccentric to the axis of the first-mentioned shaft, the inner end of said stub shaft projecting into said ring gear; and a spur gear on the inner portion of said stub shaft in mesh with said ring gear, said gears effecting a speed reduction of predetermined ratio between said stub shaft and the first-mentioned shaft that is altered by an interchange of units.

7. A speed reducer comprising a rotatable sprocket wheel; a rotatable sprocket pinion; means rotatively mounting said sprocket wheel and sprocket pinion; a chain operatively connecting said sprocket wheel and sprocket pinion; a carrier fast on the sprocket pinion mounting means and rotatable therewith; a ring gear on said carrier; a readily replaceable interchangeable unit comprising a hollow cap removably mounted adjacent the sprocket pinion mounting means; a stub shaft journaled in said cap with its axis eccentric to the axis of the sprocket pinion; and a spur gear on the inner portion of said stub shaft in mesh with said ring gear.

8. A speed reducer comprising a hollow housing having an opening in a side wall; a sprocket wheel rotatably mounted in said housing; a sprocket pinion having a shaft journaled in said housing opposite said opening; a chain operatively connecting said sprocket wheel and sprocket pinion; a carrier fast on the sprocket pinion shaft and rotatable therewith; a ring gear on said carrier, and a readily removable interchangeable unit comprising a hollow cap detachably mounted on said housing to close said opening; a stub shaft journaled in said cap disposed with its axis eccentric to the axis of the sprocket pinion shaft; and a spur gear on the inner portion of said stub shaft in mesh with said ring gear.

9. A speed reducer comprising a hollow housing having an opening in a side wall; a chain and sprocket reducing assembly operating in said housing, said assembly including a sprocket pinion shaft that is journaled opposite said opening; a carrier actuated by said shaft and provided with a ring gear; and a readily replaceable interchangeable unit comprising a hollow cap removably mounted on said housing to close said opening; a stub shaft carried by said cap and disposed parallel with and eccentric to the axis of said sprocket pinion shaft; and a spur gear on said stub shaft in mesh with said ring gear; said cap together with the spur gear and stub shaft being readily removable from the housing, whereby the unit may be replaced by another unit having a different spur gear to effect a change of speed reduction imparted to the sprocket pinion shaft.

10. A speed reducer comprising a housing provided with an opening; a speed reducing assembly operating in said housing, said assembly including a rotatable shaft adjacent said opening; and a readily replaceable interchangeable unit comprising a cap demountably secured to said housing to close the opening therein; a rotatable shaft journaled in said cap with its axis parallel to the axis of the first-mentioned shaft; and gears effecting operative connection between said shafts, one of said gears carried by the shaft journaled in said cap and demountable therewith.

11. A speed reducer comprising a housing provided with aligned openings in opposite walls; a speed reducing assembly operating in said housing, said assembly including a rotatable shaft disposed with its ends adjacent said openings; caps secured to said housing at the respective openings therein; rotatable stub shafts journaled in the respective caps with their axes parallel to the axis of the first-mentioned shaft; and separate gear sets each effecting operative connection between the first-mentioned shaft and the respective stub shafts, one of the gears of each set being carried by the adjacent stub shaft; each cap with its stub shaft and the gear carried thereby comprising a unitary assembly that is demountably secured to said housing for effecting ready replacement thereof.

12. A speed reducer comprising a housing provided with aligned openings; a chain and sprocket reducing assembly operating in said housing, said assembly including a rotatable pinion sprocket shaft disposed in alignment with and extending between said openings; ring gears carried by the end portions of said shaft; and readily replaceable interchangeable units on the exterior of said housing, said units comprising caps demountably secured to said housing at said openings; rotatable stub shafts journaled in said caps with their axes parallel to and eccentric with respect to the axis of the first-mentioned shaft; and pinions on said stub shafts in mesh with said ring gears.

13. A speed reducer comprising a housing having aligned openings; a chain and sprocket reducing assembly operating in said housing, said assembly including a pinion sprocket and shaft disposed between said openings; bearing members mounted in said openings and extending inward toward said pinion sprocket for journaling said shaft; carriers secured to the end portions of said shaft; ring gears on said carriers that are positioned in said housing openings; caps secured at the housing openings, said caps having outward projecting portions that are provided with bearings the axes of which are offset with respect to the axis of said pinion sprocket shaft; rotatable stub shafts journaled in the bearings of the respective caps; and pinions on said stub shafts in mesh with the respective ring gears; the said caps, stub shafts and pinions constituting separate unitary assemblies demountably secured to the housing for effecting ready replacement of either of said units.

14. A speed reducer comprising an elongated housing; sprocket wheels rotatably mounted intermediate the ends of said housing; pinion sprockets in opposite ends of said housing; shafts rotatably supporting said pinion sprockets; chains extending in opposite directions from said sprocket wheels for operative connection with the respective pinion sprockets; ring gears secured to the ends of said shafts; and unitary driving assemblies at the ends of said housing adjacent said ring gears, said assemblies comprising caps provided with bearings, the bearings in each cap disposed eccentric to the axis of the adjacent shaft; stub shafts journaled in said bearings; pinions on said stub shafts removably meshed with said ring gears; and means demountably securing said unitary assemblies to said housing.

RALPH E. CHERRY.
NORMAN C. BREMER.